Jan. 4, 1927.  
H. W. LANGBEIN  
BRAKE TESTING MACHINE  
Filed Jan. 18, 1926  
1,612,928  
2 Sheets-Sheet 1
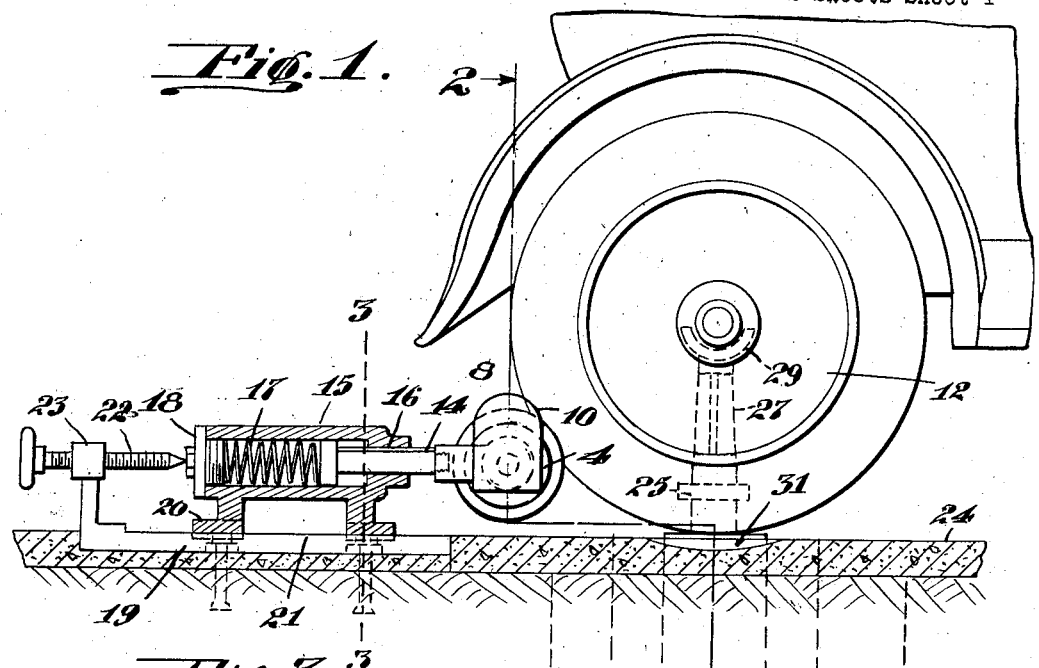
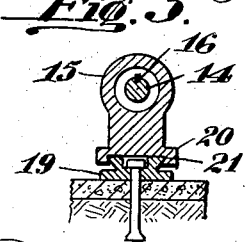
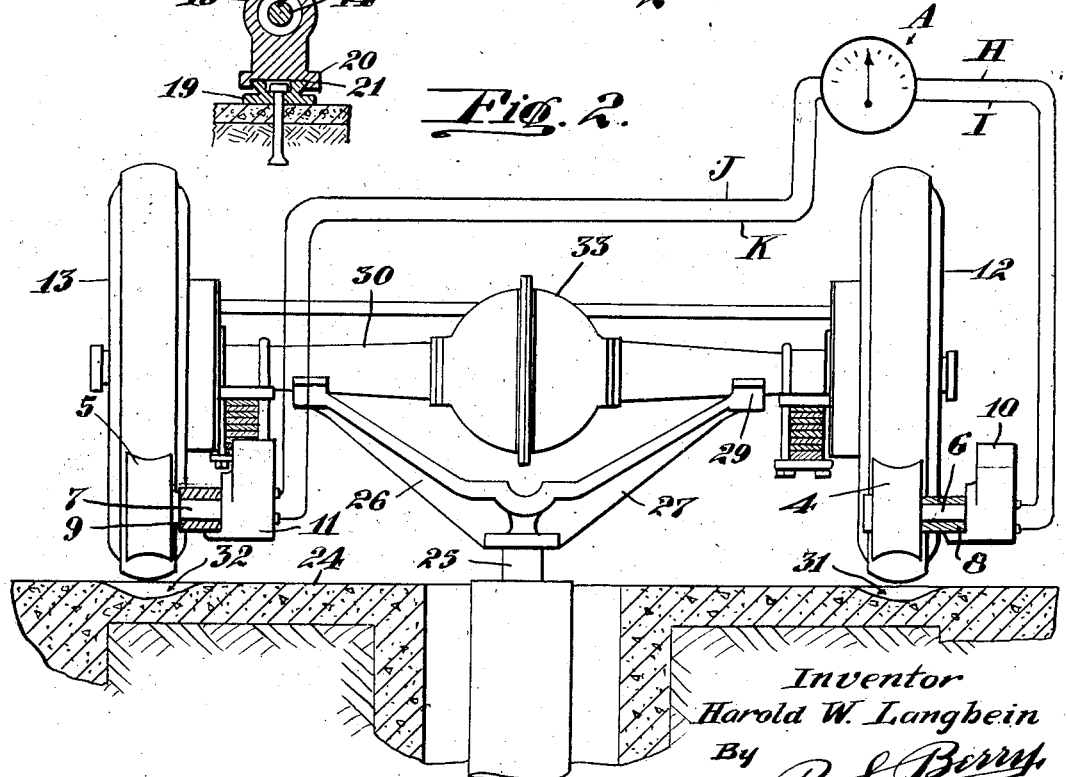
Inventor  
Harold W. Langbein  
By R. S. Berry  
Atty.

Jan. 4, 1927.   H. W. LANGBEIN   1,612,928
BRAKE TESTING MACHINE
Filed Jan. 18, 1926   2 Sheets-Sheet 2

Inventor
Harold W. Langbein
By R. S. Berry
Att'y.

UNITED STATES PATENT OFFICE.

HAROLD W. LANGBEIN, OF LOS ANGELES, CALIFORNIA.

BRAKE-TESTING MACHINE.

Application filed January 18, 1926. Serial No. 81,942.

This invention relates to a brake testing device and more especially pertains to a device for facilitating adjustment of the brakes and brake operating mechanism of the motor vehicles, such as automobiles or the like.

An object of the invention is to provide a means whereby the relative braking action of the brakes operating on a plurality of wheels may be readily ascertained so as to enable rapid adjustment of the brakes in effecting equalization thereof.

Another object is to provide a device of the above character whereby the necessity of making road tests to determine the braking action of the adjusted brakes will be rendered unnecessary.

Another object is to provide a device for indicating the efficiency of a brake on a vehicle wheel which is operable by rotation of the wheel, and which device is simple in construction and efficient in operation and which may be readily applied.

A further object is to provide an indicating instrument operable by a plurality of electrical circuits developed by the rotation of a plurality of vehicle wheels whereby relative speeds of rotation of the vehicle wheels may be accurately indicated.

With the foregoing objects in view, together with such other objects and advantages as may subsequently appear, the invention resides in the provision of at least a pair of magnetos in association with mechanism operable by rotation of a pair of vehicle wheels and in the provision of an indicating instrument operated by opposing independent electrical circuits generated by the operation of said magnetos to indicate relative speeds of rotation of the vehicle wheels.

The invention further resides in the parts and in the combination, construction and arrangement of parts, hereinafter described and claimed and illustrated by way of example in the accompanying drawings, in which:—

Fig. 1 is a view of the device as seen in side elevation and partly in vertical section and showing the invention as applied;

Fig. 2 is a view in section and elevation as seen on the line 2—2 of Fig. 1;

Fig. 3 is a view in cross section as seen on the line 3—3 of Fig. 1;

Figure 4:
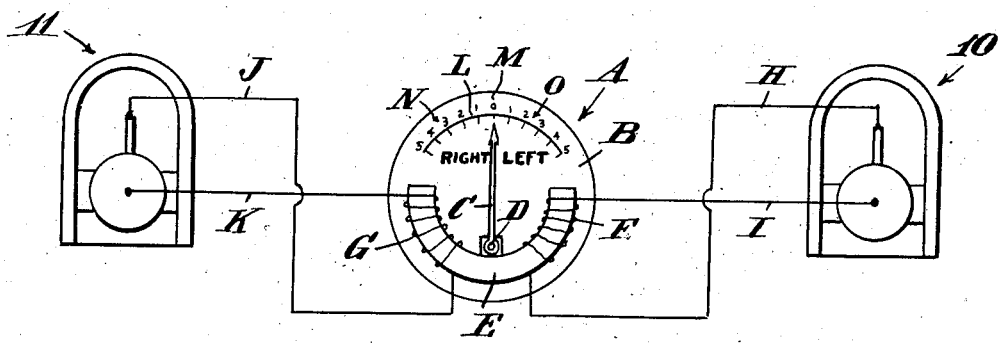
Fig. 4 is a diagrammatic view of the electrically operated indicator with its associated independently driven magnetos.

Referring to the drawings more specifically, 4 and 5 indicate a pair of rollers carried on shafts 6 and 7, journalled in bearings 8 and 9 and which shafts are operatively connected to magnetos 10 and 11 here shown as arranged adjacent the bearings 8 and 9 but which obviously may be situated at any convenient point remote therefrom. The rollers 4 and 5 are designed to be brought into operative contact with the tread portions of the tires on the driving wheels 12 and 13 of a motor vehicle whereby when the wheels are rotated with the vehicle stationary and the wheels elevated to a position clear of the ground the rollers 4 and 5 will be revolved by reason of their frictional engagement with the tires so as to effect operation of the magnetos 10 and 11.

To accomplish this purpose each of the bearings 8 and 9 is here shown as fitted with a horizontally reciprocal stem 14 on which it is carried, the stem being slidably supported in a casing 15 and having splined connection therewith as indicated at 16, whereby the stem is held against rotation and which stem is normally disposed in a forward position under the urge of a spring 17 arranged in the casing 15 and bearing between the inner end of the stem 14 and a cap nut 18 screwed on the outer end of the casing 15. The casing 15 is slidably supported on a base plate 19; being provided with a base block 20 engaged in a guideway 21 on the base plate and held against rearward movement by a screw 22 threaded in fixed standard 23, which screw abuts against the cap nut 18 and serves as a means for adjusting the position of the casing 15 and the roller carried thereby to accommodate the device for operation with vehicle wheels of various diameters.

The rollers 4 and 5 are disposed with their axes in horizontal alignment and are suitably spaced apart and disposed close to a platform 24 so that a vehicle may be backed onto the platform to position its rear wheels with the tire tread in peripheral contact with the rollers 4 and 5 and with the rollers positioned on a plane below the horizontal diameter of the wheels and clear of mud guards, bumpers or the like with which the vehicle may be equipped.

Means are provided for elevating the vehicle wheels which is here shown as embodying a hydraulic jack 25 including upwardly diverging arms 26 and 27 fitted with saddles 28 and 29 adapted to be engaged with the vehicle rear axle housing 30 in such manner that the jack may be operated to lift the axle housing and dispose the vehicle wheels 12 and 13 with the treads of the tires clear of the ground. As a means for facilitating positioning of the rear axle housing over the saddles on the jack, the platform 20 is formed with arcuate recesses of depressions 31 and 32 spaced forwardly from the rollers 4 and 5 with their centers positioned on a vertical plane extending through the centers of the saddles 28 and 29.

Arranged at any suitable point convenient for observation is an indicating instrument A embodying a dial B and a pointer C mounted for oscillatory movement over the dial; the pointer being fixed on a rock shaft D and normally extending perpendicular to the horizontal under the urge of the weight of a segmental solenoid core affixed to and carried on the rock shaft. The core E is connected intermediate its ends to the rock shaft D so as to establish a balance and wound around the end portions of the core are solenoid magnet coils F and G; the terminals of the coil F connecting with conductors H and I leading to the terminals of the magneto 10 and the terminals of the coil G connecting with conductors J and K leading to the terminals of the magneto 11.

The magnetos are provided with corresponding fixed magnetic permanent fields so that the voltage will be directly proportional to the speed of the magneto rotors.

There is thus provided a pair of complementary independent sources of electrical energy and circuits with opposing solenoid magnets, which pair of magnets are operable to actuate a single core according to relative variations in the magnetic influence of the magnets resulting from variations of the electromotive force developed by the magnetos.

The dial B is provided with an arcuate graduated scale L having a central zero graduation M normally designated by the pointer C and with two groups of consecutively numbered graduations N and O leading to the left and to the right of the central graduation adapted to be designated by the pointer C as it moves either to the left or right from center under the urge of the magnets.

In the operation of the invention the vehicle is backed on the platform 24 to position the rear wheels 12 and 13 in alignment with the rollers 4 and 5 and is brought to rest with the rear wheels seating in the recesses 31 and 32, which positions the rear axle housing 30 above the saddles 28 and 29 on the jack. The rollers 4 and 5 are so spaced relatively to the recesses 31 and 32 that when the vehicle comes to rest with the wheels disposed in the recesses the wheels will previously have made contact with the rollers 4 and 5 so as to press the latter rearwardly in opposition to the springs 17. The jack is then operated to cause the saddles 28 and 29 to engage the rear axle housing 30 and lift the latter sufficiently to dispose the tread portions of the tires on the wheels 12 and 13 clear of the platform 24 as shown; the rollers 4 and 5 being then advanced under the urge of the spring 17 and maintained by the pressure of the latter in frictional engagement with the vehicle tires. The vehicle wheels are then rotated by means of the vehicle motor in the usual manner through the conventional vehicle differential gear mechanism in a differential housing 33 and through the usual associated axles connecting with the wheels. The vehicle wheels on being rotated will revolve the independent rollers 4 and 5 which will operate through the shafts 6 and 7 to actuate the magnetos 10 and 11 and thereby create two independent electrical circuits which energize the magnet coils F and G, which exert opposing pulls on the core E. In event the vehicle wheels revolve at corresponding peripheral speeds, like degrees of electromotive force will be developed by the magnetos and accordingly, equal opposing pulls will be exerted by the magnet coils so as to counteract each other and thereby maintain the core E and the pointer C in their normal position with the pointer designating the zero graduation M.

In event of difference in the peripheral speed of the vehicle wheels, a corresponding difference in electromotive forces generated by the magnetos will occur and as a result, one of the magnets F or G will exert a stronger pull on the core E than the other magnet according to which of the magneto rotors is being revolved at a greater speed than the other so that the magnet coil exerting the greater pull will act to shift the core E in opposition to the pull of the other magnet and thereby rock the indicator pointer to either side of its normal central position according to which of the magnet coils exerts the greatest pull. For example, assume that the right hand wheel 12 is revolving at a greater peripheral speed than the left hand wheel 13. The rotor of the magneto 10 will then be revolved at a greater speed than the rotor of the magneto 11 and thereby generate such electromotive force in the circuit through the conductor H and I and the magnet F as to cause this magnet to exert a greater pull on the core E than will be exerted by the magnet coil G in the circuit through the conductors J and K created by the magneto 11. This pull of the magnet coil F will act to swing the pointer C to the left of center so as to designate by the scale N, denoted as the right hand scale, that the right hand wheel is rotating at a greater peripheral speed than the left hand wheel. Any structural defect in the wheels or their mountings that would occasion variation in their peripheral speed on their being driven through the vehicle transmission may thus be initially indicated.

In order to test the relative braking action of the vehicle brakes on the vehicle wheels, the brakes are applied to the brake drums of the wheels in any suitable manner through the medium of the usual brake operating mechanism with which the vehicle is equipped, so as to effect retardation of rotation of the wheels. In event the action of the brakes on each of the wheels is equalized the retardation of the wheels will be equal and the peripheral speeds of the wheels will correspond, and accordingly, the pointer of indicating instrument A will remain normal and thereby denote that the brakes are in proper relative adjustment, but in event the brakes do not apply simultaneously and in unison and one of the brakes exerts a greater braking action than the other, as is permitted by the vehicle differential gear mechanism, so that the vehicle wheels will rotate at different peripheral speeds relatively to each other and will thereby effect a corresponding action on the rollers 4 and 5 and the magnetos 10 and 11, so that the indicating instrument will then denote the difference in the relative speeds of the vehicle wheels as before described.

The operator may then make the necessary adjustments on the brake or brake operating mechanism to bring about the desired uniformity or equalization of their braking action.

It will be seen that by the use of this invention a very accurate adjustment of the brakes will be facilitated, as the operator, by observing the indications of the indicator may readily determine the effect of any adjustment to either brake without necessitating road-tests.

Figure 5:
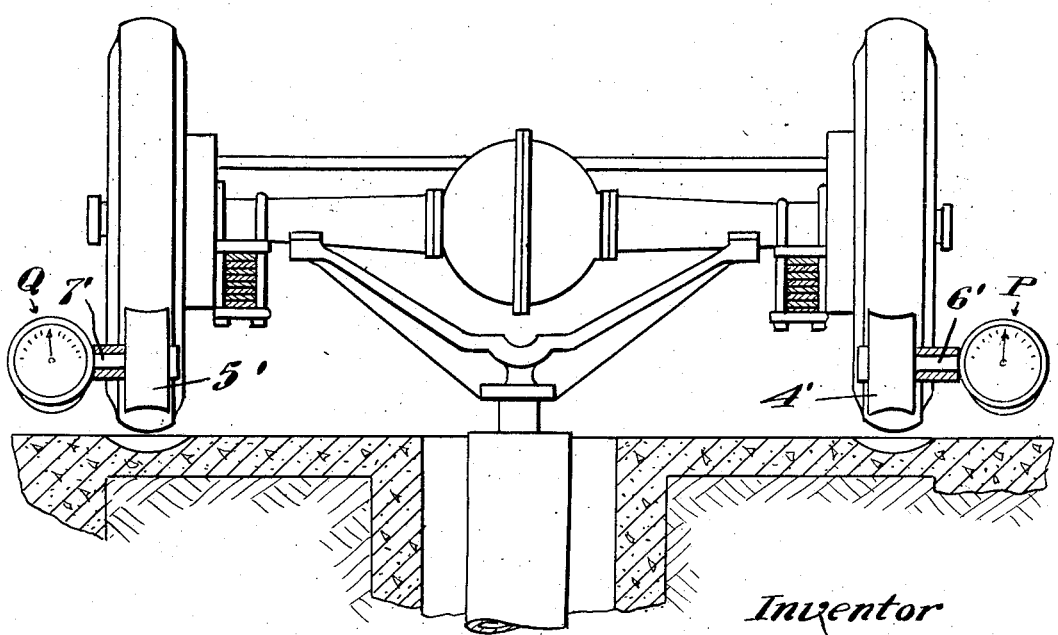
Fig. 5 is a view illustrating a modified form of the invention.

In the modified form of the invention, shown in Fig. 5, rollers 4' and 5' are mounted in the manner described with reference to the rollers 4 and 5 and are fixed on shafts 6' and 7' operatively connected to tachometers P and Q operable to independently indicate the revolutions per minute of the vehicle wheels impelling the rollers 4' and 5'; the relative readings of the tachometers P and Q serving to denote the relative peripheral speeds of the vehicle wheels and on being compared with each other serving to indicate whether the wheels are rotating at corresponding peripheral speeds or at different peripheral speeds in relation to each other.

While I have shown and described a specific embodiment of my invention I do not limit myself to the exact details of construction or arrangement shown but may employ such changes and modifications, including omission of parts, as occasion may require without departing from the spirit of the invention as defined in the accompanying claims.

I claim:—

1. A brake testing machine for motor vehicles, comprising a pair of energy generators for independent operative connection with a pair of the driving wheels of the vehicle, and means influenced by the energies from said generators for selectively indicating a variation in the speeds of rotation of the driving wheels of the vehicle.

2. A brake testing machine for motor vehicles, comprising a pair of electric generators for independent operative connection with a pair of the driving wheels of the vehicle, a magnet electrically connected with each generator, a core common to both magnets, and an indicator comprising an index operable by said core.

3. In a device of the character described, a pair of independent rollers, a slide bar, supporting each of said rollers, casings carrying the slide bars, springs normally disposing said slide bars in a forwardmost position and operable to maintain the rollers on the slide bars in operative relation to a pair of vehicle wheels, and means operable by said rollers for indicating relative peripheral speeds of the wheels.

4. In a device of the character described, a pair of independent rollers, a slide bar supporting each of said rollers, a casing carrying each slide bar, a spring normally disposing each of said slide bars in a forwardmost position and operable to maintain the roller on the slide bar in operative relation to a vehicle wheel, means whereby the casings may be adjusted to various positions, and means operable by the rollers for indicating relative peripheral speeds of the vehicle wheels.

5. In a machine for determining relative peripheral speeds of vehicle wheels, a pair of complementary magnetos for creating independent electrical circuits, means for actuating said magnetos from a pair of vehicle wheels, a pair of independent magnet coils in the circuit of said magnetos, and means operable by said coils to indicate the relative electromotive forces developed by said magnetos and thereby indicate relative peripheral speeds of the vehicle wheels.

6. In a machine for determining relative peripheral speeds of vehicle wheels, a pair of complementary magnetos for creating independent electrical currents, means for actuating said magnetos from a pair of vehicle wheels, a pair of independent magnet coils in the circuit of said magnetos, and indicator and means whereby opposing forces exerted by energization of said magnet coils will act on said indicator to denote the relative electromotive forces developed by said magnetos.

7. In a machine for determining relative peripheral speeds of vehicle wheels, a pair of complementary magnetos for creating independent electrical circuits, means for actuating said magnetos from a pair of vehicle wheels, a rock shaft, a pair of independent magnet coils in the circuits of said magnetos, arranged to exert opposing forces when energized, means whereby the forces exerted by said magnets will be imparted to said rock shaft operable to move said rock shaft when the relative forces of the magnets vary, and means operable by turning of the rock shaft for indicating the relative peripheral speeds of the vehicle wheels.

In testimony whereof, I have affixed my signature.

HAROLD W. LANGBEIN.